(12) United States Patent
Adams (10) Patent No.: US 8,909,301 B2
(45) Date of Patent: Dec. 9, 2014

(54) SYSTEMS AND METHODS FOR PRESENTING AN IMAGE ON A DISPLAY OF A MOBILE DEVICE

(71) Applicant: Research in Motion Limited, Waterloo (CA)

(72) Inventor: Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/759,112

(22) Filed: Feb. 5, 2013

(65) Prior Publication Data

US 2013/0172054 A1 Jul. 4, 2013

Related U.S. Application Data

(63) Continuation of application No. 12/126,034, filed on May 23, 2008, now Pat. No. 8,396,514.

(51) Int. Cl.
*H04M 1/02* (2006.01)
*H04M 1/57* (2006.01)
*H04M 1/2745* (2006.01)
*H04M 3/42* (2006.01)

(52) U.S. Cl.
CPC ........ *H04M 1/576* (2013.01); *H04M 1/274508* (2013.01); *H04M 3/42042* (2013.01); *H04M 2201/38* (2013.01)
USPC ........... 455/566; 455/515; 455/517; 455/518; 379/93.23

(58) Field of Classification Search
CPC .............. H04M 1/57; H04M 3/42042; H04M 1/72519; H04M 1/7258
USPC .............. 455/95, 403, 415, 412-2, 566, 517, 455/518, 457, 158.4-5; 345/481, 619, 156, 345/157, 160, 164, 167, 168, 169; 379/88.11, 88.12, 93.23, 142.04, 379/142.17
See application file for complete search history.

(56) References Cited

U.S. PATENT DOCUMENTS

| 5,559,868 A | 9/1996 | Blonder |
| 5,696,815 A | 12/1997 | Smyk |

(Continued)

FOREIGN PATENT DOCUMENTS

| CA | 2666187 C | 7/2012 |
| EP | 2124423 B1 | 7/2011 |
| EP | 2343873 A1 | 7/2011 |

OTHER PUBLICATIONS

Flickr "Flickr: Photos tagged with Facebook" available online: www.flickr.com/photos/tags/facebook/, retrieved Aug. 14, 2007.

(Continued)

*Primary Examiner* — Cong Tran
(74) *Attorney, Agent, or Firm* — Bereskin & Parr LLP/S.E.N.C.R.L., s.r.l.

(57) ABSTRACT

The described embodiments relate generally to methods, systems and handheld electronic communications devices for selecting and displaying a caller ID image from an image database configured to respond to user input and selectively display images on a display. The image database stores at least one tag identifier data corresponding to each image. An address book database stores at least one individual identifier and at least one corresponding address. A caller ID image corresponding to at least one caller ID is selected from the images and displayed on the display.

17 Claims, 8 Drawing Sheets

(56) References Cited

U.S. PATENT DOCUMENTS

| | | |
|---|---|---|
| 5,875,239 A | 2/1999 | Koralewski et al. |
| 5,907,604 A | 5/1999 | Hsu |
| 5,987,104 A | 11/1999 | Tomimori |
| 5,999,599 A | 12/1999 | Shaffer et al. |
| 6,567,848 B1 | 5/2003 | Kusuda et al. |
| 6,731,727 B2 | 5/2004 | Corbett et al. |
| 6,990,108 B2 | 1/2006 | Karlsson et al. |
| 6,990,181 B2 | 1/2006 | Corbett et al. |
| 7,082,141 B2 | 7/2006 | Sharma et al. |
| 7,155,211 B2 | 12/2006 | Mun et al. |
| 7,174,163 B2 | 2/2007 | Aksu et al. |
| 7,177,627 B2 | 2/2007 | Melaku et al. |
| 7,194,259 B2 | 3/2007 | DeLine |
| 7,227,532 B2 | 6/2007 | Bohn et al. |
| 7,236,576 B2 | 6/2007 | Schnarel et al. |
| 7,254,223 B1 | 8/2007 | Henderson |
| 7,257,210 B1 | 8/2007 | Henderson |
| 8,396,514 B2 * | 3/2013 | Adams .................. 455/566 |
| 2002/0067816 A1 | 6/2002 | Bushnell |
| 2002/0094806 A1 | 7/2002 | Kamimura |
| 2003/0012353 A1 | 1/2003 | Tang et al. |
| 2003/0022659 A1 | 1/2003 | Mun et al. |
| 2003/0032413 A1 | 2/2003 | Aksu et al. |
| 2003/0032414 A1 | 2/2003 | Melaku et al. |
| 2004/0203835 A1 | 10/2004 | Trottier et al. |
| 2005/0074105 A1 | 4/2005 | Corbett et al. |
| 2006/0003783 A1 | 1/2006 | Fukui et al. |
| 2007/0032225 A1 | 2/2007 | Konicek et al. |
| 2007/0036313 A1 | 2/2007 | White et al. |
| 2008/0096534 A1 * | 4/2008 | Yoon ..................... 455/412.1 |
| 2008/0250066 A1 * | 10/2008 | Ekstrand et al. ........... 707/104.1 |
| 2008/0300010 A1 * | 12/2008 | Border et al. ............. 455/556.1 |
| 2009/0137270 A1 * | 5/2009 | Nielsen et al. ............ 455/556.1 |
| 2010/0075712 A1 * | 3/2010 | Sethuraman et al. ...... 455/556.1 |
| 2010/0114822 A1 * | 5/2010 | Pollock et al. ................ 707/623 |

OTHER PUBLICATIONS

Microsoft Office Online "Get a digital ID—Outlook—Microsoft Office Online" available online: http://office.microsoft.com/en-us/outlook/HP012305371033.ASPX, retrieved Jul. 26, 2007.

European Search and Examination Report, on European Patent Application No. 08156871, dated Nov. 24, 2008.

European Search and Examination Report, on European Patent Application No. 11160095.3, dated May 17, 2011.

Canadian Office Action, on Canadian Patent Application No. 2,666,187, dated Jan. 26, 2011.

European Communication under Rule 71(3) EPC (Intent to Grant), on European Application No. 08156871.9, dated Feb. 2, 2011.

European Communication under Rule 71(3) EPC (Intent to Grant), on European Application No. 11160095.3, dated Feb. 27, 2012.

* cited by examiner

SYSTEMS AND METHODS FOR PRESENTING AN IMAGE ON A DISPLAY OF A MOBILE DEVICE

CROSS REFERENCE TO RELATED APPLICATION

This application is a continuation of prior U.S. patent application Ser. No. 12/126,034 filed on May 23, 2008, the entirety of which is hereby incorporated by reference.

TECHNICAL FIELD

The described embodiments relate generally to methods and systems for displaying an image on a display of a mobile device. Described embodiments also relate to a mobile device employing such systems and methods.

BACKGROUND

Mobile devices often provide multimedia functionality. In addition to providing communication functionality, mobile devices are also typically equipped to display images or other multimedia information to a user.

It is desired to address or ameliorate one or more shortcomings or disadvantages associated with existing ways of displaying caller ID information on a mobile device, or to at least provide a useful alternative to such ways.

BRIEF DESCRIPTION OF THE DRAWINGS

For a better understanding of the described example embodiments and to show more clearly how they may be carried into effect, reference will now be made, by way of example, to the accompanying drawings in which.

DETAILED DESCRIPTION

The example embodiments described herein relate generally to methods and systems for displaying an image on a display of a mobile device. Described example embodiments also relate to a mobile device employing such systems and methods.

Certain example embodiments relate to a method for displaying a caller ID image on a handheld electronic device. The device comprises: an image database configured to store a plurality of images and wherein the image database is configured to store tag identification data corresponding to each image; a display; a display interface operatively coupled to the display and to the image database, wherein the display interface is configured to respond to user input and selectively displaying images on the display; a communications module configured for sending and receiving communication signals, wherein the communication signals comprise at least one caller ID; and an address book database configured to store address book data, wherein the address book data comprises individual identification data and corresponding address data.

The method comprises: receiving a communication signal; determining a first caller ID from the communication signal; determining a caller ID image corresponding to at least one image and corresponding to the first caller ID; and displaying the caller ID image on the display.

The display interface may further comprise a user input component having at least one selected from the group consisting of: a keyboard, a thumbwheel, a trackball, a directional pad, a joystick and a touch screen.

In some embodiments, the display interface is configured to receive input corresponding to a desired image from the images stored in the image database and the display interface is configured to cause the display to display the desired image.

The method may further comprise comparing the first caller ID to the address data. The address data may comprise at least one phone number and the comparing may comprise comparing the first caller ID to the at least one phone number.

In some embodiments, the method includes determining a first individual identifier by matching the first caller ID to an address data. Determining the caller ID image may comprises matching the first individual identifier to a tag identifier corresponding to the caller ID image.

The method may also comprise: determining a second caller ID; and determining a second individual identifier by matching the second caller ID to an address data. Such method may include: determining a tag identifier corresponding to both the first caller ID and to the second caller ID, and determining the caller ID image corresponding to the determined tag identifier.

For some embodiments, determining the caller ID image may comprise: determining a first tag identifier corresponding to the first caller ID; determining a second tag identifier corresponding to the second caller ID; determining a first image corresponding to the first tag identifier; determining a second image corresponding to the second tag identifier; creating a caller ID image by combining the first and second images.

The method of some embodiments may further comprise: determining a plurality of second caller IDs; and determining a plurality of second individual identifiers by matching each second caller ID to an address data. The method may further comprise: determining a tag identifier corresponding to both the first caller ID and to the plurality of second caller IDs; and determining the caller ID image corresponding to the determined tag identifier.

Some aspects provide a computer-readable medium comprising instructions executable on a processor of an electronic device for implementing the methods noted above.

Other aspects are directed to a handheld electronic device, comprising: an image database configured to store a plurality of images and wherein the image database is configured to store at least one tag identifier data corresponding to each image; a display; a display interface operatively coupled to the display and to the image database, wherein the display interface is configured to respond to user input and selectively display images on the display; a communications module configured for sending and receiving communication signals, wherein the communication signals comprise at least one caller ID; an address book database configured to store at least one individual identifier and at least one corresponding address data; and a caller identifier module configured to select from the images and display on the display, a caller ID image corresponding to the at least one caller ID.

The caller identifier module may be configured to receive a first caller ID from the communications module and may also be configured to determine a first individual identifier. The caller identifier module may be configured to determine the first individual identifier by matching the first caller ID to an address data. The caller identifier module may further be configured to determine the caller ID image by matching the first individual identifier to a tag identifier corresponding to the caller ID image.

In other embodiments, the caller identifier module is configured to receive a second caller ID from the communications module and wherein the caller identifier module is configured to determine a second individual identifier by matching the second caller ID to an address data. In some variations, the caller identifier module may further be configured to: determine a tag identifier corresponding both the first caller ID and to the second caller ID, and determine the caller ID image corresponding to the determined tag identifier. In other variations, the caller identifier module may further be configured to: determine a first tag identifier corresponding to the first caller ID; determine a second tag identifier corresponding to the second caller ID; determine a first image corresponding to the first tag identifier; determine a second image corresponding to the second tag identifier; and create the caller ID image by combining the first and second images.

The display interface may be configured to receive input corresponding to a desired image from the images stored in the image database and wherein the display interface is configured to cause the display to display the desired image. The display interface may include a user input component, and such user input component may comprise at least one selected from the group consisting of: a keyboard, a thumbwheel, a trackball, a directional pad and a joystick and a touch screen.

Figure 1:
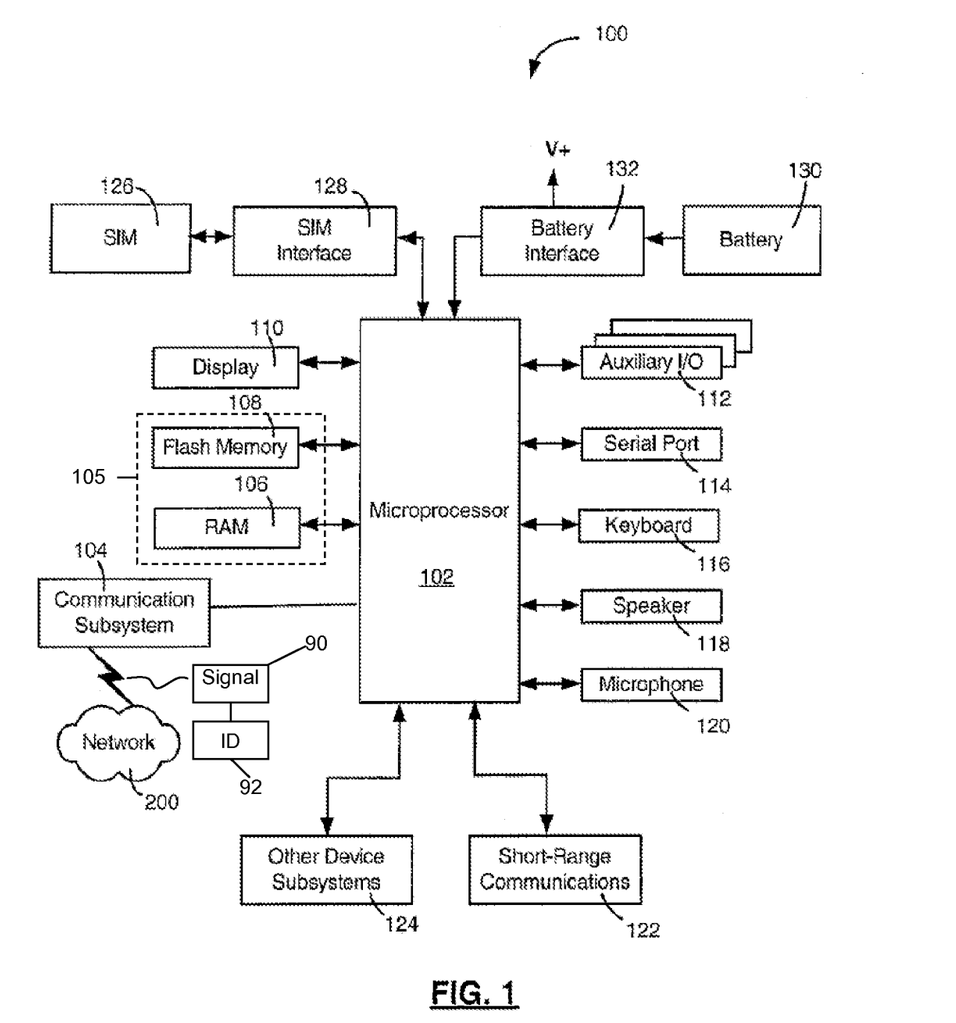
FIG. 1 is a block diagram of a mobile device in one example implementation.
Figure 2:
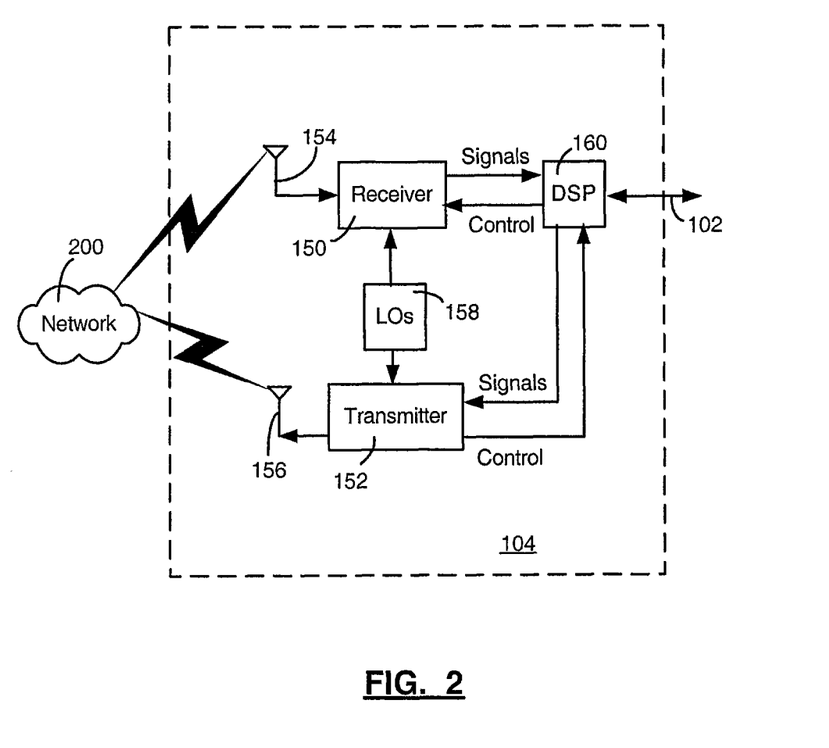
FIG. 2 is a block diagram of a communication sub-system component of the mobile device of FIG. 1.
Figure 3:
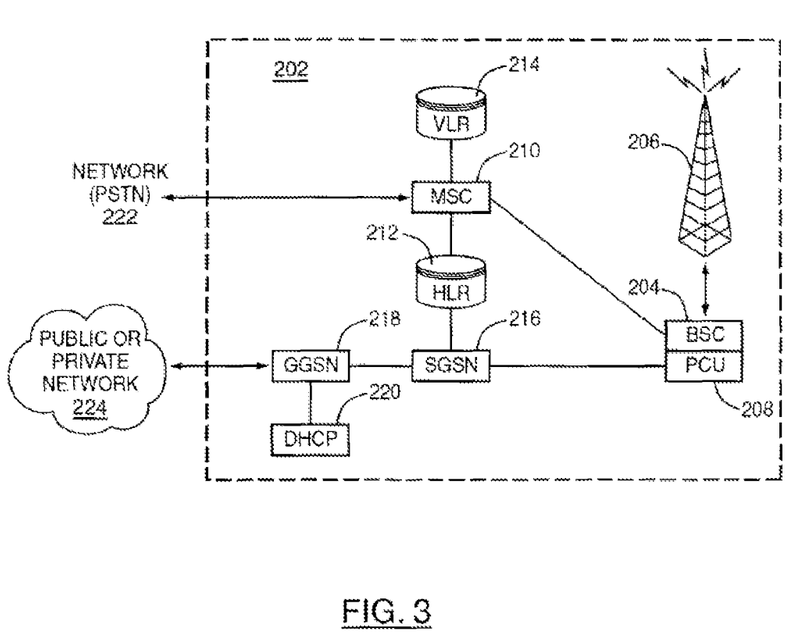
FIG. 3 is a block diagram of a node of a wireless network.

Reference is now made to FIGS. 1 through 3, which described an example mobile device accordingly to the disclosed concept.

Referring first to FIG. 1, a block diagram of a mobile device in one example implementation is shown generally as 100. Mobile device 100 comprises a number of components, the controlling component being microprocessor 102. Microprocessor 102 is typically programmed with an operating system 103 and controls the overall operation of mobile device 100. In some embodiments, certain communication functions, including data and voice communications, are performed through a communications module also referred to herein as a communication subsystem 104. Communication subsystem 104 receives communications signals 90 (also referred to herein as "messages") from and sends messages to a wireless network 200. By way of example only, such communication signals 90 may correspond to phone calls, email or other data messages. Such communications signals 90 typically include identification information (such as caller ID information or identifier data 92) identifying the source of the message, as will be understood. In some instances, for example a conference call involving multiple third parties, the communications signals may include a plurality of caller IDs 92.

In this example implementation of mobile device 100, communication subsystem 104 is configured for cellular communication in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS).

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as memory 105 which may include a Random Access Memory (RAM) 106 and flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software 103 code used by microprocessor 102 is typically stored in a persistent store such as flash memory 108, which may alternatively be a read-only memory (ROM) or similar storage element (not shown). Those skilled in the art will appreciate that the operating system code 103, specific device applications, or parts thereof, may be temporarily loaded into a volatile store such as RAM 106.

In some embodiments, mobile device 100 may send and receive communication signals 90 over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing media transfers, such as music and/or image downloading or streaming, and messaging, such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information. In certain embodiments, SIM 126 may comprise a different type of user identifier and may be integral to mobile device 100 or not present at all.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a voice call, text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112.

Auxiliary I/O subsystem 112 may include devices such as: a touch screen, mouse, track ball, infrared fingerprint detector, and one or more roller wheels with dynamic button pressing capability. Keyboard 116 comprises an alphanumeric keyboard and/or telephone-type keypad. A composed item may be transmitted over network 200 through communication subsystem 104. User input components comprised in auxiliary I/O subsystem 112 may be used by the user to navigate and interact with a user interface of mobile device 100.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals 90 received by antenna 154 through network 200 are input to receiver 150, which may perform such common receiver functions as signal amplification, frequency down conversion, filtering, channel selection, and analog-to-digital (A/D) conversion. A/D conversion of a received signal 90 allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218.

There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Embodiments of mobile device 100 may be equipped and configured for communication over a cellular connection via communication subsystem 104 and with a wireless local area network (WLAN) using a communication form commonly termed "Wi-Fi". Such Wi-Fi connections may employ a suitable WLAN-compatible communication technology, of which unlicensed mobile access (UMA) technology is one example. UMA technology provides access to GSM and GPRS mobile services over unlicensed spectrum technologies, including Bluetooth™ and 802.11 wireless connections. UMA enables cellular network subscribers to roam and hand over between cellular networks and public and private wireless networks using dual-mode mobile handsets. Mobile device 100 may also be configured for communication with local wireless devices, such as Bluetooth™ enabled devices and may be configured for communication in a global positioning system (GPS) context.

The configuration and operation of an example mobile device, such as mobile device 100, in the context of displaying caller ID information is described in further detail in relation to FIGS. 4 to 7B.

Figure 4:
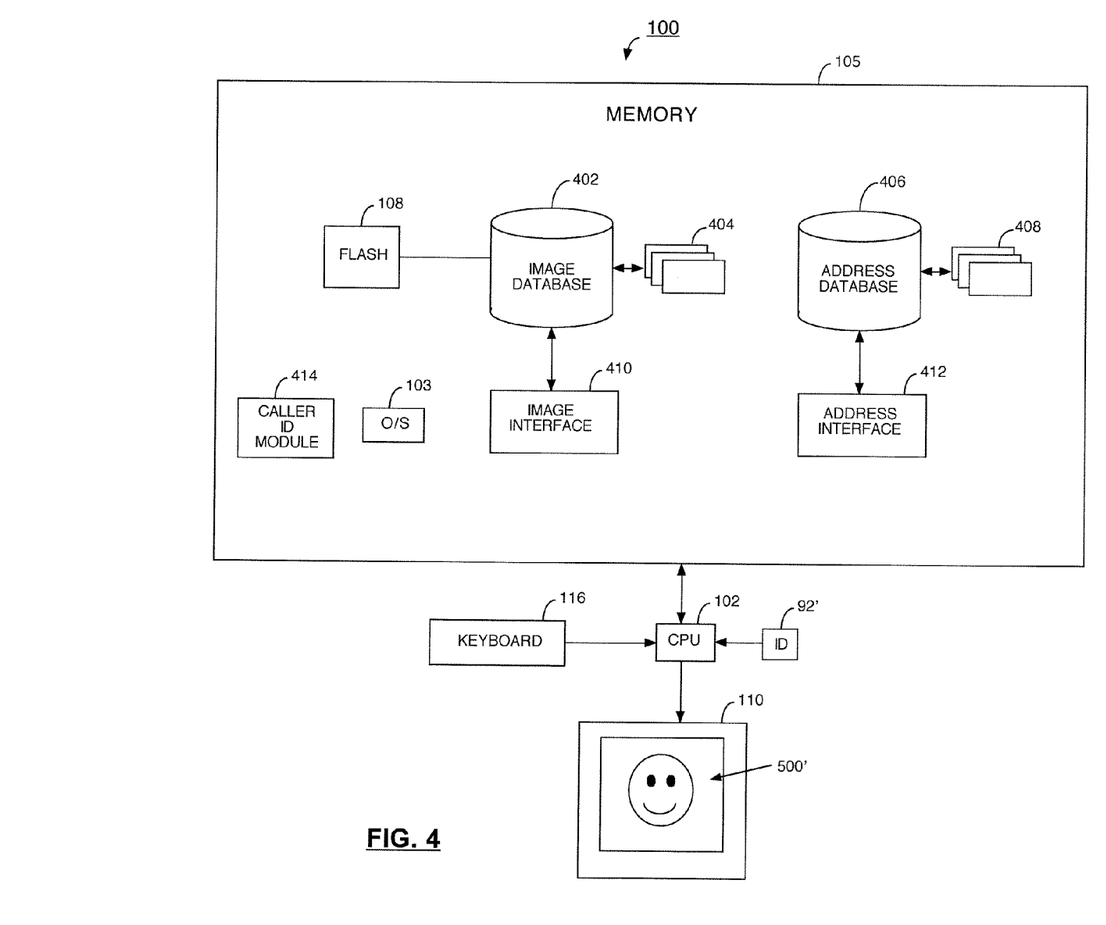
FIG. 4 is a schematic diagram showing in further detail various components of the mobile device of FIG. 1.
Figure 5:
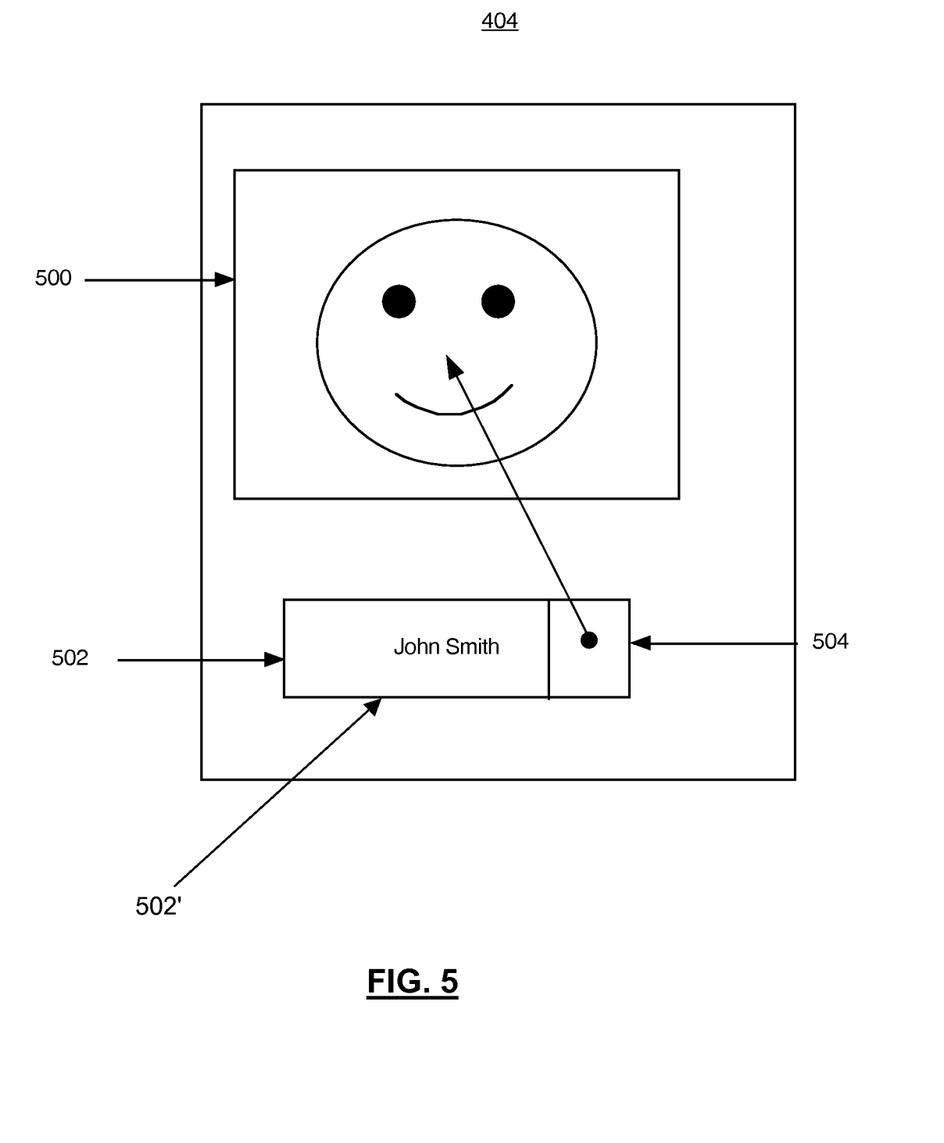
FIG. 5 is a schematic diagram of an example image data record as may be stored in the image database of the mobile device of FIG. 1.

Referring now to FIG. 4, components of mobile device 100 are shown and described in further detail. The mobile device 100 includes an image database 402 which may be stored in memory 105 or other data storage. Referring simultaneously to FIGS. 4 and 5, the image database 402 is configured to store a plurality of image data records 404 each containing data corresponding to an image 500. Each image data record 404 preferably also stores at least one tag identifier 502. Typically, a tag identifier 502 is a name or nickname of a person appearing in the image 500, but also may be a place (eg. "Taj Mahal") or event name (eg. "Bob's Graduation Party") or other identification relevant to the image 500. In some embodiments, the file name for an image data recorded 404 may be used as a tag identifier 502.

Each tag identifier 502 may also be provided with a tag link 504 or other location data corresponding to a location in the image 500 relevant to the tag. For example, a tag link 504 may point to the centre of a person's face in the image 500. As will be understood, the tag identifiers 502 can be used as an index to retrieve desired images 500 from the image database 402.

Figure 6:
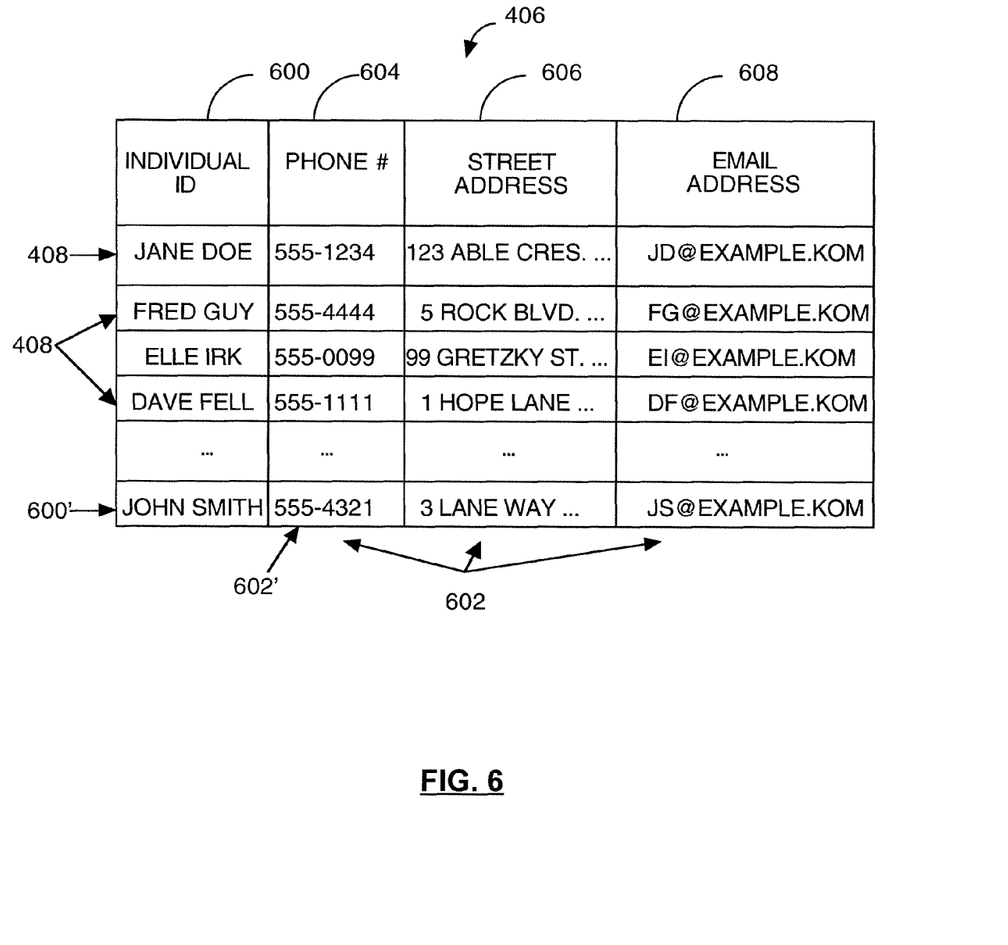
FIG. 6 is a schematic diagram of example address data as may be stored in the address database of the mobile device of FIG. 1.

The device 100 also includes an address book database 406 which may be stored in memory 105 or other data storage. Referring simultaneously to FIGS. 4 and 6, the address book database 406 is configured to store a plurality of address data records 408 each containing contact information data corresponding to an individual identifier 600 (such as a name, e.g. "Davey Jones") and one or more corresponding address data 602 (for example a phone number 604, mailing address 606, or email address 608).

Referring to FIG. 4, an image display interface 410 is provided which includes computer program instructions stored within memory 105 (which may include flash memory 108) for execution by the CPU 102. An address interface 412 is also provided which includes computer program instructions stored within memory 105 for execution by the CPU 102.

The display interface 410 is configured to enable a user to select and display images 500 on the display 110. The display interface 410 includes or is operatively coupled to the keyboard 116 or one or more of the user input components in the auxiliary I/O subsystem 112, such as a thumbwheel, trackball, directional pad, joystick, or touchscreen which enable the user to select or otherwise generate user input received by the CPU 102 and designating which image(s) 500 the user wishes to selectively display or otherwise manipulate on display 110.

The address interface 412 is configured to enable a user to input and store the address data 408 in the address database 406. The address interface 412 includes or is operatively coupled to the keyboard 116 or one or more of the user input components in the auxiliary I/O subsystem 112, such as a thumbwheel, trackball, directional pad, joystick, or touchscreen which enable the user to select or otherwise generate user input received by the CPU 102 to input or otherwise modify the address data 408.

A caller identifier module 414 is also provided which includes computer program instructions stored within memory 105 for execution by the CPU 102. Memory 105 comprises various other program code, such as other software applications, although these are not specifically shown for purposes of simplicity of illustration. Data storage 105 accessible by the CPU 102 may also include high speed cache memory.

As discussed in greater detail below, the caller identifier module 414 is configured to select one or more images 500 from the images 404 corresponding to a caller ID 92 and display a caller ID image 500' (comprising the selected image (s) 500) on the display 110.

Figure 7:
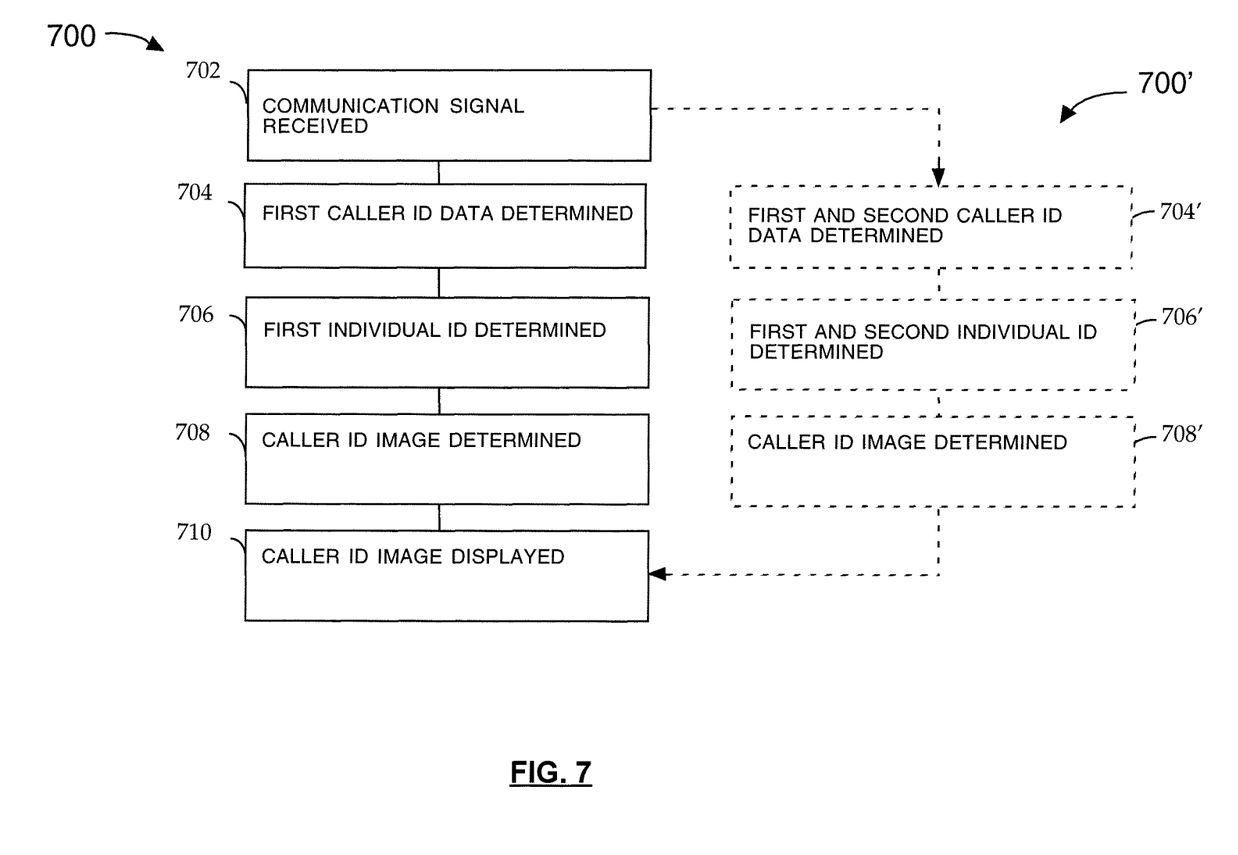
FIG. 7 is a flowchart of a method for presenting photo caller ID as may be used by the mobile device.

Referring now to FIG. 7, there is shown a method 700 of displaying a caller ID image 500' on mobile device 100.

In operation, the method 700 is initiated by the device 100 receiving at least one communications signal 90, typically in the form of a telephone call (or conference call) (Block 702). The caller identifier module 414 then determines first caller identifier data 92' from the communications signal 90 (Block 704). The caller identifier module 414 then determines a first individual identifier 600' by comparing the first caller ID 92' to the address data 602 stored in the address data records 408 (Block 706). Once the caller identifier module 414 locates an address 602' corresponding to the first caller ID 92', the corresponding individual identifier data 600 for that record 408 is selected to be the first individual identifier 600'. As noted, typically, the caller ID 92' and the corresponding address data 602 are phone numbers 604, but may vary depending on the application and nature of the communication signal 90. In some embodiments, the caller ID 92' may be an alphanumeric string (such as a name "John Smith") and in such instances, in Block 706 the caller ID 92' may alternately, or in addition be directly compared to the individual identifier 600.

The caller identifier module 414 then determines a caller ID image 500' (Block 708). The caller identifier module 414 may accomplish this by matching the first individual identifier 600' to a tag identifier 502' in an image data record 404, with the image 500 of such image data record 404 being selected as the caller ID image 500'. As will be understood, the matching of the individual identifier 600' need not exactly match the selected tag identifier 502, but the caller identifier module 414 may be programmed with fuzzy logic or other analysis to select a tag identifier 502 most closely corresponding to the individual identifier 600'. For example, the caller identifier module 414 might match individual identifier data 600' "John Smith" to a tag identifier 502 "Big John S.". Once the caller ID image 500' is determined, it is displayed on the display (Block 710).

As will be understood, in some instances when displaying the caller ID image 500' on the display 110 in Block 710, the caller ID module 414 might be programmed to use the image's 500 corresponding tag link 504 and crop the image 500 at the region pointed to by the tag link 504, prior to displaying it. In effect, the cropped image would become the caller ID image 500'. Such a cropping technique would be useful, for example, if the caller ID image 500' is too large to fully display on the display 110, as an alternate to scaling or shrinking the entire image 500.

As will also be understood, when determining the caller ID image 500' in Block 708 in some instances more than one image 500 may be determined to acceptably correspond to the first individual identifier 600'. While the caller ID module 414 may be programmed to determine or select a single such image 500 in Block 710, alternatively, the caller ID module may select several or all such acceptably corresponding images 500, and successively display them 500 (for a period of time, each) during the phone call. In such instance, the caller ID image 500' might comprise a successive plurality of images 500.

Furthermore, when displaying the caller ID image 500' pursuant to Block 710, as will be understood, the image 500' may be displayed as a background "watermark" image in addition to or in place of displaying the image 500' in a designated portion of the display 110.

Alternate variations of the method are also contemplated. In FIG. 7 an alternate method 700' (including new steps in Blocks 704'-708') is also illustrated, in the case of a conference call involving two third party callers, in Block 704', the caller identifier module 414 determines first caller identifier data 92' for the first third party caller and second caller identifier data 92' for the second third party caller from the signal 90. Similarly, in Block 706', the caller identifier module 414 determines both a first individual identifier 600' and a second individual identifier 600' by comparing the first caller ID 92' and the second caller ID 92' to the address data 602 stored in the address data records 408.

In Block 708', the caller identifier module 414 may determine a caller ID image 500' by matching the first individual identifier 600' and the second individual identifier 600' to one or more tag identifiers 502 in a single image data record 404, with the image 500 of such image data record 404 being selected as the caller ID image 500'. For example, if the first individual identifier data 600' was "John Smith" and the second individual identifier data 600' was "Sally Brown", the caller ID module 414 might match such data 600' to an image data record 404 having a single tag identifier 502 "Sally and John in Hawaii" or to a data record having a first tag identifier 502 "Sally Brown" and a second tag identifier 502 "John Smith".

If no single tag identifier 502 could be found which acceptably corresponded to both the first and second individual identifier data 600', the caller ID module 414 might be programmed to match the first individual identifier 600' to a first tag identifier 502 with the corresponding image 500 being selected as a first image, and match the second individual identifier 600' to a second tag identifier 502 with the corresponding image 500 being selected as a second image and combining the first and second images 500 to create the caller ID image 500'.

Once the caller ID image 500' has been determined, it is printed as set out and discussed previously in respect of Block 710.

Figure 8:
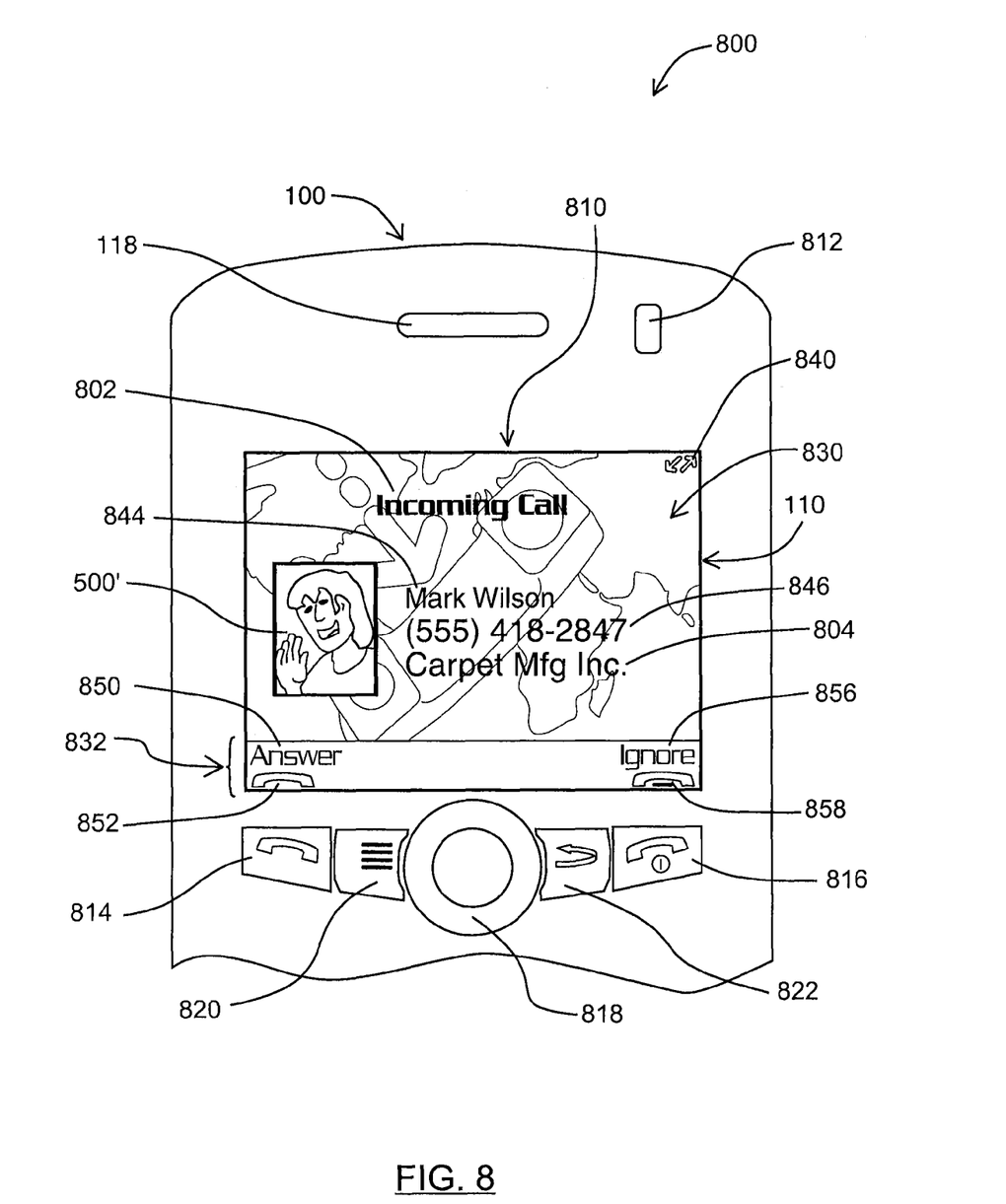
FIG. 8 is a graphical representation of a display of the mobile device showing an image.

Referring now to FIG. 8, a screenshot of a user interface provided to a user in accordance with an example implementation of one embodiment is shown generally as 800.

In FIG. 8, screenshot 800 illustrates a user interface displayed in a display 110 of a mobile device 100, namely for an incoming call screen 810 used to inform the user of calls being received at mobile device 100. An "incoming call" indicator 802 is displayed, shown centrally justified (horizontally) near the top of display 110 in this example, indicating that a call is being received at mobile device 100. Mobile device 100 provides an integrated speaker 118, a visual alert indicator 812, a send key 814, an end key 816 (end key 816 is also used as a power-on key in this example implementation), a track ball 818, a menu key 820, and an escape key 822.

While send key 814, end key 816, menu key 820 and escape key 822 are shown as physical keys provided on the mobile device in this example, it will be understood by persons skilled in the art that some mobile devices may provide one or more of these keys as virtual keys on a touch-sensitive screen.

A company name 804, along with name of the caller 844, phone number 846, and Caller ID image 500' is displayed in caller identification data field 830. A data transmission indicator 840 in the upper-right hand corner of display 110 is also displayed.

Incoming call screen 810 is divided into a caller identification data field 830 and a key label field 832. In this example, the combined areas of caller identification data field 830 and key label field 832 occupy the entire area of display 110. Moreover, the area of caller identification data field 830 is much greater than the area of key label field 832, allowing for greater flexibility in the layout of caller identification data and potentially making displayed caller identification data easier to read. In this example, key label field 832 is illustrated as one contiguous field, although more than one separate key label field may be displayed on incoming call screen 810 in variant embodiments.

In this example, key label field 832 is confined to a narrow section of display 110, at an end of display 110 nearest the send key 814 and end key 816 provided by mobile device 100. A first label is displayed in an area on display 110 within key label field 832 close to and above send key 814 (which the user can use to answer the incoming call). The first label comprises a text identifier "Answer" 850 and an answer icon 852. A second label comprises a text identifier "Ignore" 856 and an ignore icon 858 (which the user can use to ignore the incoming call).

As will be understood, for conference calls involving more than two third parties, the caller ID module 414 may be programmed to perform the steps of Blocks 704'-708' with appropriate repetitions and modifications for additional third party callers or in the event a third party caller drops off the line and the caller ID image 500' is correspondingly modified/updated.

While the above description provides example embodiments, it will be appreciated that some features and/or functions of the described embodiments are susceptible to modification without departing from the spirit and principles of operation of the described embodiments. Accordingly, what has been described above is intended to be illustrative of the claimed concept and non-limiting.

The invention claimed is:

1. A method for displaying caller ID imagery on a mobile device, the device having:
   (a) an image database configured to store a plurality of images and wherein the image database is configured to store tag identification data corresponding to each image;
   (b) a display;
   (c) a display interface operatively coupled to the display and to the image database, wherein the display interface is configured to respond to user input and selectively display images on the display;
   (d) a communications module configured for sending and receiving a plurality of simultaneous communication signals, wherein each communication signal comprises a caller ID; and
   (e) an address book database configured to store address book data, wherein the address book data comprises individual identification data and corresponding address data, the method comprising:
   (f) receiving a plurality of communication signals;
   (g) for each communication signal, determining a caller ID from the communication signal;
   (h) determining a caller ID image corresponding to at least one image and corresponding to each of the determined caller IDs; and
   (i) displaying the determined caller ID image on the display.

2. The method as claimed in claim 1, wherein the display interface comprises a user input component, and wherein the user input component comprises at least one selected from the group consisting of: a keyboard, a thumbwheel, a trackball, a directional pad, a joystick and a touch screen.

3. The method as claimed in claim 1, wherein the display interface is configured to receive input corresponding to a desired image from the images stored in the image database and wherein the display interface is configured to cause the display to display the desired image.

4. The method as claimed in claim 1, further comprising:
   (a) comparing each caller ID to the address data.

5. The method as claimed in claim 4, wherein the address data comprises at least one phone number, and wherein the comparing comprises comparing each caller ID to at least one phone number.

6. The method as claimed in claim 1, further comprising:
   (a) for each caller ID, determining an individual identifier by matching the caller ID to an address.

7. The method as claimed in claim 6, wherein (h) comprises:
   (a) for each caller ID, determining a selected caller ID image by matching the caller ID's corresponding individual identifier to a tag identifier and selecting a caller ID image corresponding to the tag identifier.

8. The method as claimed in claim 7, wherein (h) comprises:
   (a) creating the determined caller ID image by combining each of the selected caller ID images.

9. The method as claimed in claim 8, wherein (h) comprises:
   (a) determining a tag identifier corresponding to all of the caller IDs; and
   (b) determining the caller ID image corresponding to the determined tag identifier.

10. A mobile device, comprising:
    (a) an image database configured to store a plurality of images and wherein the image database is configured to store at least one tag identifier corresponding to each image;
    (b) a display;
    (c) a display interface operatively coupled to the display and to the image database, wherein the display interface is configured to respond to user input and selectively display images on the display;
    (d) a communications module configured for sending and receiving a plurality of simultaneous communication signals, wherein each communication signal comprises a caller ID;
    (e) an address book database configured to store at least one individual identifier and at least one corresponding address; and
    (f) a caller identifier module configured to select from the images and display on the display, a caller ID image corresponding to all of the caller IDs.

11. The device as claimed in claim 10, wherein the caller identifier module is configured to receive each caller ID from the communications module and wherein the caller identifier module is configured to determine a corresponding individual identifier for each caller ID.

12. The device as claimed in claim 11, wherein the caller identifier module is configured to determine each individual identifier by matching the corresponding caller ID to an address.

13. The device as claimed in claim 12, wherein the caller identifier module is configured to:
    (a) determine a tag identifier corresponding to each of the caller IDs; and
    (b) determine the caller ID image corresponding to the determined tag identifier.

14. The device as claimed in claim 12, wherein the caller identifier module is configured to:
    (a) for each caller ID, determine a tag identifier corresponding to the caller ID;
    (b) for each caller ID, select an image corresponding to the corresponding tag identifier; and
    (c) create the determined caller ID image by combining the selected images.

15. The device as claimed in claim 10, wherein the display interface is configured to receive input corresponding to a desired image from the images stored in the image database and wherein the display interface is configured to cause the display to display the desired image.

16. The device as claimed in claim 15, wherein the display interface comprises a user input component, and wherein the user input component comprises at least one selected from the group consisting of: a keyboard, a thumbwheel, a trackball, a directional pad, a joystick and a touch screen.

17. A computer-readable medium comprising instructions executable on a processor of the mobile device for implementing the method of claim 1.

* * * * *